United States Patent
Wilson et al.

(10) Patent No.: US 11,218,558 B2
(45) Date of Patent: Jan. 4, 2022

(54) MACHINE LEARNING FOR PERSONALIZED, USER-BASED NEXT ACTIVE TIME PREDICTION

(71) Applicant: Microsoft Technology Licensing, LLC, Redmond, WA (US)

(72) Inventors: Alexander Wilson, Seattle, WA (US); Tom Neckermann, Seattle, WA (US); Romain Rey, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/878,541

(22) Filed: May 19, 2020

(65) Prior Publication Data

US 2021/0368015 A1 Nov. 25, 2021

(51) Int. Cl.
*H04L 29/08* (2006.01)
*G06Q 10/10* (2012.01)
*G06N 20/00* (2019.01)
*H04L 12/58* (2006.01)

(52) U.S. Cl.
CPC ............ *H04L 67/24* (2013.01); *G06N 20/00* (2019.01); *G06Q 10/1095* (2013.01); *H04L 51/18* (2013.01); *H04L 67/22* (2013.01)

(58) Field of Classification Search
CPC ......... H04L 67/24; H04L 51/18; H04L 67/22; G06Q 10/1095; G06N 20/00
See application file for complete search history.

(56) References Cited

U.S. PATENT DOCUMENTS

| 7,493,369 | B2 | 2/2009 | Horvitz et al. |
| 9,160,700 | B2 | 10/2015 | Kau et al. |
| 10,454,855 | B2 | 10/2019 | Rife |
| 2004/0003042 | A1 | 1/2004 | Horvitz et al. |
| 2005/0021485 | A1 | 1/2005 | Nodelman et al. |
| 2006/0069686 | A1 | 3/2006 | Beyda et al. |
| 2008/0162632 | A1 | 7/2008 | O'sullivan et al. |

(Continued)

OTHER PUBLICATIONS

"What is Cal-heatmap?", Retrieved from: https://web.archive.org/web/20150726221222/https:/cal-heatmap com/, Jul. 26, 2015, 32 Pages.

(Continued)

*Primary Examiner* — El Hadji M Sall
(74) *Attorney, Agent, or Firm* — NovoTechIP International PLLC

(57) ABSTRACT

Techniques performed by a data processing system for predicting availability of a user include receiving, from a first computing device over a network connection, a first request for predicted availability of a first user to participate in an online communication session, wherein the first request includes an identifier associated with the first user and a time period for the predicted availability of the user, in response to receiving the first request, determining a first predicted availability of the first user over the predicted time period using a first machine learning model trained with user information from a plurality of data sources, the user information being indicative of when the user is likely to be available to participate in the online communication session, and sending, to the first computing device over the network connection, availability information including the first predicted availability of the first user.

19 Claims, 11 Drawing Sheets

(56) References Cited

U.S. PATENT DOCUMENTS

| | | |
|---|---|---|
| 2009/0187650 A1 | 7/2009 | Cervantes et al. |
| 2016/0255139 A1* | 9/2016 | Rathod ................ H04L 51/046 709/203 |
| 2017/0013408 A1 | 1/2017 | Grzywaczewski et al. |
| 2017/0178080 A1 | 6/2017 | Abebe et al. |
| 2018/0077090 A1 | 3/2018 | Ground et al. |
| 2018/0107987 A1 | 4/2018 | Mackenzie et al. |

OTHER PUBLICATIONS

Phadke, Pratik, "Calendar Heatmaps in GTL", Retrieved from: https://blogs.sas.com/content/graphicallyspeaking/2011/12/08/calendar-heatmaps-in-gtl/, Dec. 8, 2011, 6 Pages.

Salve, et al., "Evaluating the Impact of Friends in Predicting User's Availability in Online Social Networks", In International Workshop on Personal Analytics and Privacy, Sep. 18, 2017, pp. 51-63.

"International Search Report and Written Opinion Issued in PCT Application No. PCT/US21/022027", dated May 6, 2021, 15 Pages.

\* cited by examiner

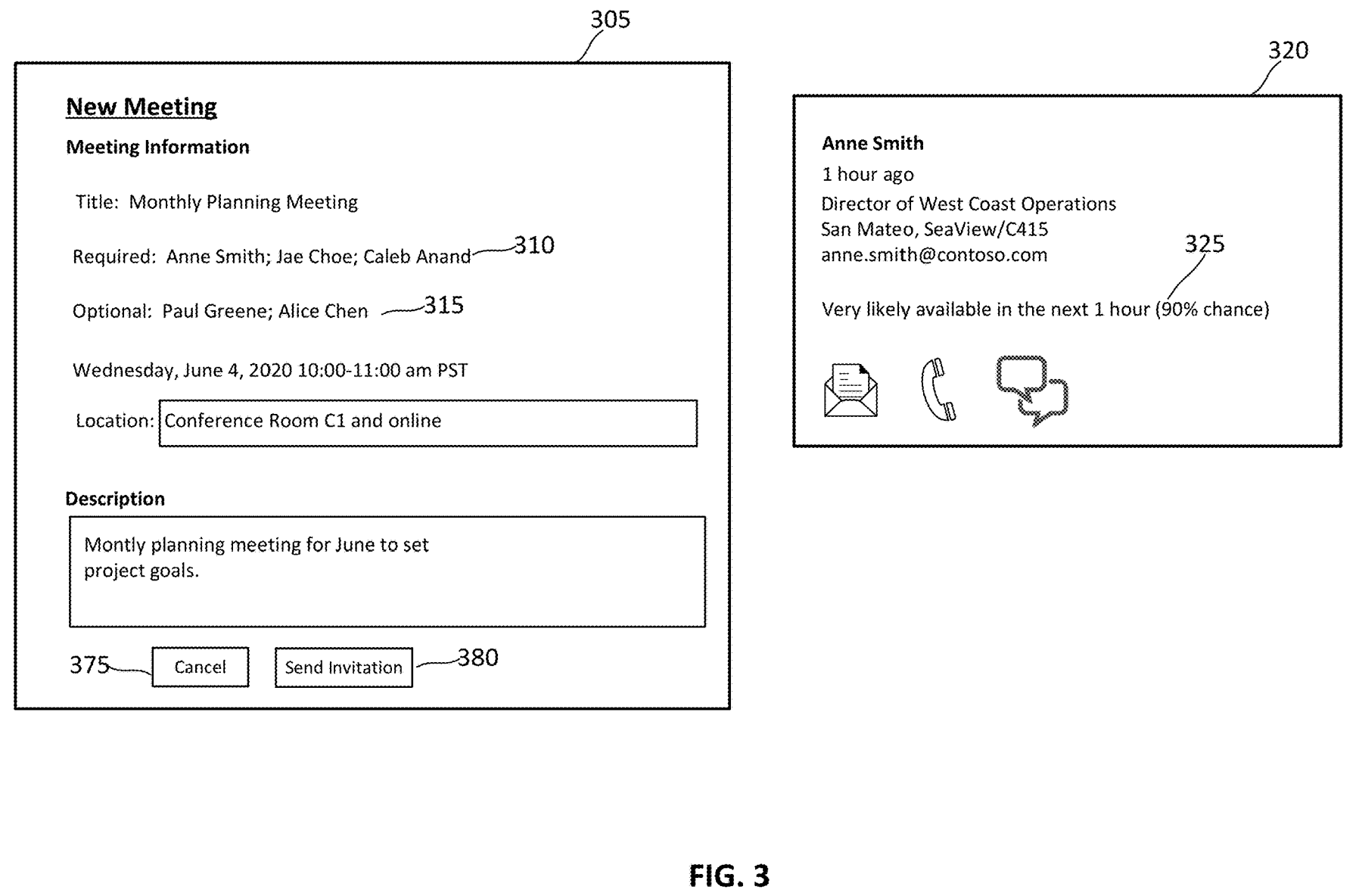

New Meeting — 305

Meeting Information

Title: Monthly Planning Meeting

Required: Anne Smith; Jae Choe; Caleb Anand — 310

Optional: Paul Greene; Alice Chen — 315

Wednesday, June 4, 2020 10:00–11:00 am PST

Location: Conference Room C1 and online

Description

Montly planning meeting for June to set project goals.

375 — Cancel    Send Invitation — 380

---

320

Anne Smith
1 hour ago
Director of West Coast Operations
San Mateo, SeaView/C415 — 325
anne.smith@contoso.com Very likely available in the next 1 hour (90% chance)

FIG. 3

Predicted Availability for Anne Smith

| Monday | Tuesday | Wednesday | Thursday | Friday | Saturday | Sunday |
|--------|---------|-----------|----------|--------|----------|--------|
| 1      | 2       | 3         | 4        | 5      | 6        | 7      |
| 8      | 9       | 10        | 11       | 12     | 13       | 14     |
| 15     | 16      | 17        | 18       | 19     | 20       | 21     |
| 22     | 23      | 24        | 25       | 26     | 27       | 28     |
| 29     | 30      |           |          |        |          |        |

■ Unavailable    ▨ Possibly Available    ▫ Available

505

FIG. 5

MACHINE LEARNING FOR PERSONALIZED, USER-BASED NEXT ACTIVE TIME PREDICTION

BACKGROUND

Large organizations often stretch across geographical areas and time zones. Colleagues collaborating on a project may be disposed across a wide geographical area. Online communications and collaboration platforms, such as Microsoft Teams, have become a critical tool to facilitate collaboration between geographically separated collaborators. However, the effectiveness of such tools may be hindered by misalignments in the schedules between team members. Not only may team members be in different times zones, but they also may have flexible work schedules. An employee's availability may depend on numerous factors, such as the employee's start and end times for their workday, the employee's lunch time, non-work obligations to family, and recreational interests such as sports and travel. As such, it may be difficult for employees to keep track of their colleagues' work schedules due to impact of these and other factors on their work schedules. Communications platforms, such as Microsoft Teams, may provide tools for determining whether a colleague is online, away, or offline. However, these tools do not provide a means for determining future activity and availability of other users. There are significant areas for new and improved mechanisms for determining the future activity and availability of others to facilitate collaborative work among users.

SUMMARY

An example data processing system according to the disclosure may include a processor and a computer-readable medium storing executable instructions. The instructions cause the processor to perform operations including receiving, from a first computing device over a network connection, a first request for predicted availability of a first user to participate in an online communication session, wherein the first request includes an identifier associated with the first user and a time period for the predicted availability of the user; in response to receiving the first request, determining a first predicted availability of the first user over the predicted time period using a first machine learning model trained with user information from a plurality of data sources, the user information being indicative of when the user is likely to be available to participate in the online communication session; and sending, to the first computing device over the network connection, availability information including the first predicted availability of the first user.

An example method performed by a data processing system for predicting user availability according to the disclosure includes receiving, from a first computing device over a network connection, a first request for predicted availability of a first user to participate in the online communication session, wherein the first request includes an identifier associated with the first user and a time period for the predicted availability of the user; in response to receiving the first request, determining a first predicted availability of the first user over the predicted time period using a first machine learning model trained with user information from a plurality of data sources, the user information being indicative of when the user is likely to be available to participate in the online communication session; and sending, to the first computing device over the network connection, availability information including the first predicted availability of the first user.

An example data processing system according to the disclosure may include a processor and a computer-readable medium storing executable instructions. The instructions cause the processor to perform operations including generating a first request for predicted availability of a first user to participate in an online communication session, wherein the first request includes an identifier associated with the first user and a time period for the predicted availability of the user; sending the first request for the predicted availability of the first user to a first remote computing device via a network connection; receiving, via the network connection, availability information including the first predicted availability of the first user; rendering, on a display of the data processing device, a representation of the availability information in the first application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 is an example user interface that shows an example of an active time prediction for a user.

FIG. 5 is another example of a user interface that show another example of an active time prediction for a user

DETAILED DESCRIPTION

Figure 1:
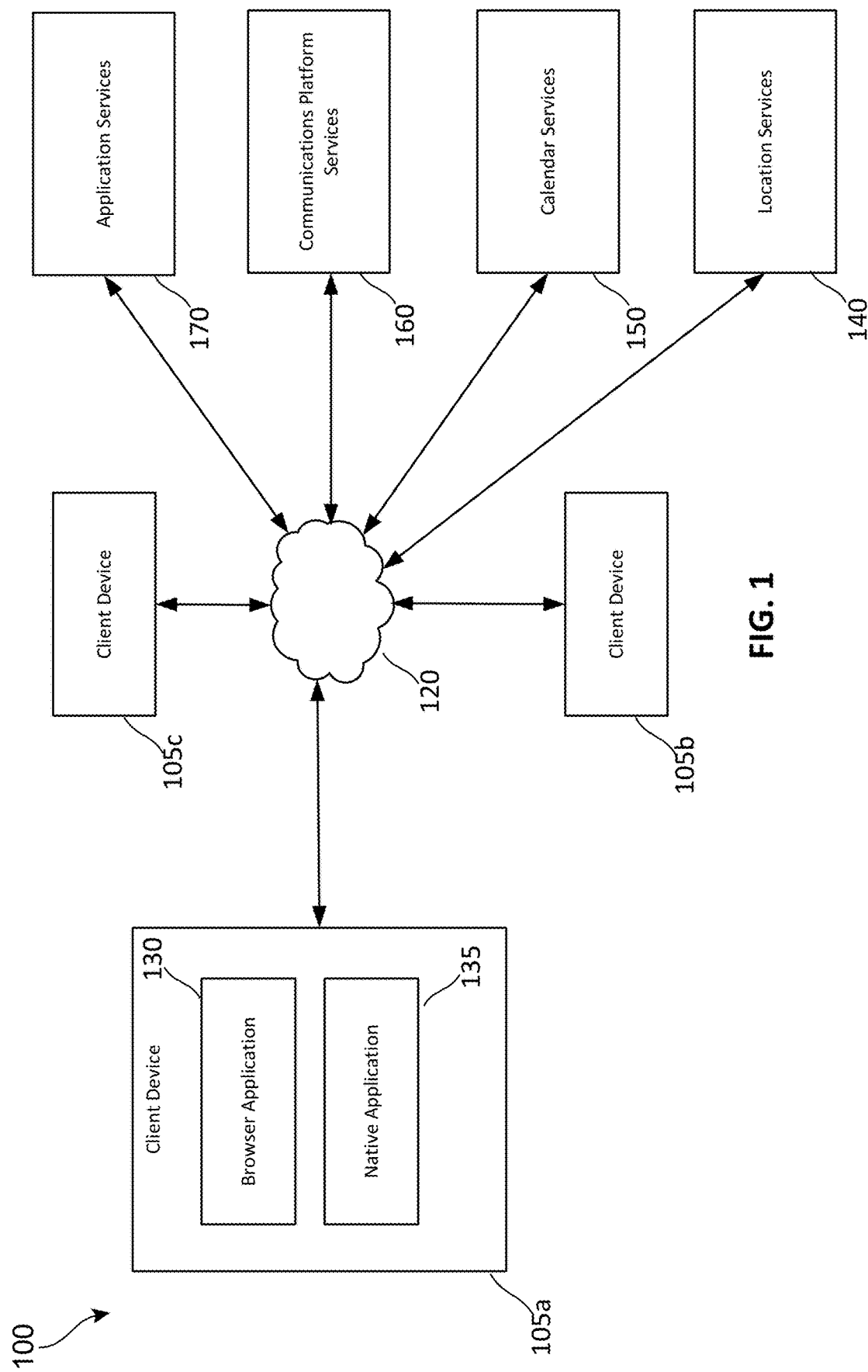
FIG. 1 is a diagram shows an example computing environment in which the techniques disclosed herein for making personalized, user-based next active time predictions for users.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for providing personalize, user-based next active time predictions are provided. These techniques help solve the problem of scheduling online meetings and/or collaborative sessions with other users who may be located in different geographic locations and/or may have significantly different working schedules. These techniques provide a technical solution to the technical problem by using machine learning to predict user availability. Machine learning models may be trained using training data obtained from numerous information sources that may be used to predict when a user may be available. One such source of information may be obtained by monitoring user activity on various native applications and/or cloud-based applications that are typically utilized by users of the of a corporation, group, or organization for which such active time predictions may be useful. The user activity information may include information such as the date, time, and duration that a user utilized an application or applications. Another source of information may be social media activity and/or networking activity by a user that may provide an indication when the user is likely to be at work or at another non-work-related activities. Another source of information may be calendar information from work and/or personal electronic calendars, which may be used to keep track of meetings, appointments, vacations, work-related travel, and/or other events that may be indicative of whether the user is at work and/or may be available for at a particular day and/or time for a meeting. Yet another source of information may be login and/or logout information from one or more work-related devices. Another source of information may be location information which may be obtained from a user's computing device or devices, such as a mobile phone or other device. Machine learning models can be trained on training data collected from a large number of users to predict general user behavior and then be fine-tuned for predicting the availability of a specific user by providing a smaller subset of training data specific to that user. Once trained, the machine learning model may be used to predict the availability of a particular user based on that user's past behavior and other information such as a user's current location. The location information may be used to reconcile a prediction with actual ground truth. If the user is determined to be located in a different location than expected, such as on vacation or otherwise away from the office when expected to be working, a prediction of the user's availability may be discarded or flagged as potentially being inaccurate. The technical benefits of these techniques include increased accuracy in predicting availability of users to facilitate scheduling of online meetings and/or other events in which the users may be geographically dispersed and have different and/or varying schedules. These techniques may be integrated into online communications and collaborations platforms, email platforms, social media platforms, networking platforms, and/or other platforms where the user may meet up with and/or conduct online communications sessions with other users. The techniques disclosed herein may also be used in a scheduling platform. The scheduling platform may provide an interface for predicting when employees are typically available and may be scheduled to work. The scheduling platform may also be used for predicting the availability of independent contractors, on-call workers, temporary workers, and other gig-based workers.

FIG. 1 illustrates an example computing environment 100 in which the techniques disclosed herein may be implemented. The computing environment 100 may include calendar services 150 that implement the techniques disclosed herein for predicting user availability. Details of the implementation of the calendar services 150 will be discussed in greater detail with respect to FIG. 2. FIG. 1 provides a high-level description of an example computing environment in which the calendar services 150 may be implemented and provides examples of some of the types of data sources from which user data may be collected to train the machine learning models used by the calendar services 150.

The calendar services 150 may be a cloud-based services that may be used for scheduling online meetings and/or other events. The calendar services 150 may provide an application programming interface (API) that provides means for scheduling online meetings and/or other events, for inviting users to participate in the online meetings and/or other events, to obtain calendar information for users having calendar information maintained by the calendar services 150, and/or for updating calendar information. Updating the calendar information may include rescheduling and/or canceling an online meeting or other event, inviting additional users to participate in a meeting, adding or modifying meeting details and/or content associated with the meeting. The calendar services 150 may also provide a user interface that allows users to access, view, and/or modify calendar information. The calendar services 150 may provide a web-based application or webpage that may be accessed by a web browser 130 that allows the users to interact with the calendar services 150. The calendar services 150 may also provide information to other applications, such as a native application 135 on a client device that provides a user interface for interacting with calendar information provided by the calendar services 150, but the native application 135 relies on the calendar services 150 to manage the calendar information. The calendar entries may be used to determine at least in part whether a user may be unavailable at a particular time. The calendar entries may indicate that the user is already scheduled to participate in another online meeting or event at a particular time.

The calendar services 150 may obtain information that can be used to train machine learning models for predicting the availability of users from various sources, such as a from client devices 105, application services 170, communications platform services 160, and location services 140. Other information sources may also be available that may provide the calendar services 150 with information that may be used to train the machine learning models used by the application.

A user may interact with one or more elements of the computing environment 100 via a client device 105. The example implementation of FIG. 1 includes three client devices 105a, 105b, and 105c. However, other implementations may include many more client devices 105. The client device 105 may be a client computer, a personal computer (PC), a tablet computer, a laptop computer, a netbook, a set-top box (STB), a gaming and/or entertainment system, a smart phone, a mobile device, a wearable device (for example, a smart watch), or other type of computing device. The client device 105 may include a web browser application 130 for accessing web-based content, which may be provided by one or more of the application services 170, communications platform services 160, and location services 140. The client device may also include a native application 135 that is configured to obtain, create, and/or modify associated with one or more of the application services 170, communications platform services 160, and location services 140.

The application services 170 may provide one or more cloud-based applications that may be accessed by a user via a client device 105. For example, the application service 170 may provide an email application, document creation and editing applications, and/or other cloud-based applications that may be accessed by a client device 105 over the network 120. The network 120 may comprise one or more public or private networks and may be implemented by the Internet. The cloud-based application may be configured to collect usage metrics that may include information, such as when users access the application or applications provided by the application service 170, the duration of each session using the application, and/or other information that may be used by the calendar services 150 to train machine learning models to predict the expected behavior of the users and to predict when a user may be available for an online meeting or other event based on the past behavior of the user.

The communications platform services 160 may provide an online communications platform in which users may conduct online meetings, share files and information, and/or perform other collaborative tasks. The communications platform services 160 may, for example, be implemented by Microsoft Teams or another such collaborative platform service. The communications platform services 160 may implement other types of communications services, such as message services, social media services, networking services, and/or other services that facilitate communications via text, audio, video, and/or other communications techniques. Social media content and/or network services content may be used to determine whether the user is at work, on vacation, and/or has other events going on that may cause the user to be unavailable. The communications platform services 160 may be configured to collect usage metrics that may include information, such as which applications the users utilize, the duration of each session using the application, and/or other information that may be used by the calendar services 150 to train machine learning models to predict the expected behavior of the users and to predict when a user may be available for an online meeting or other event based on the past behavior of the user.

The location services 140 may provide location information for the user. For example, the location services 140 may be configured to determine a location of a client device 105 of the user. The functionality of the location services may, in some implementations, be implemented by a network service provider that provides connectivity to the client device 105. For example, the location services 140 may be implemented by a wireless services provider that is configured to determine a location of the client device 105. The location services 140 may be configured to determine the location of the client device 105 in response to a request from the client device 105 and/or from another element of the computing environment 100, such as the calendar services 150, the communications platform 160, and/or the application services 170. The location services 140 may also keep track of various location information that may be used to build a model of the expected behavior of the user. For example, location information where the user lives, works, goes to school or has family members that go to school, may be maintained by the location services 140 for the user. Other information may also be determined, such as where and when the user typically logs into a particular application provided by the communications platform services 160 and/or the application services 170 may be tracked to help establish a model of the user's behavior in order to better predict when and where the user may be available.

Figure 2:
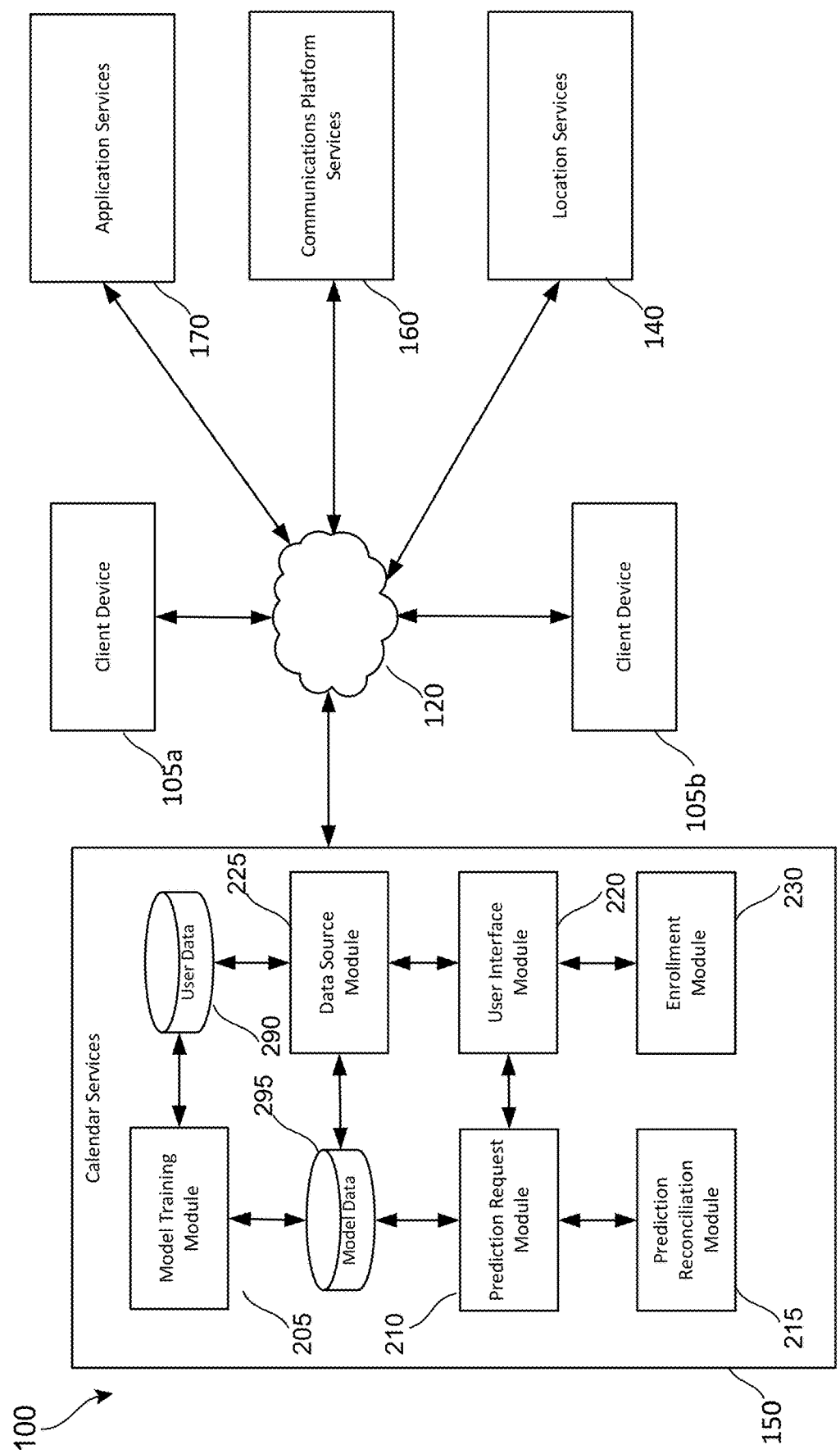
FIG. 2 is a diagram illustrating additional details of the calendar services computing environment shown in FIG. 1.

FIG. 2 shows another view of the computing environment 100 that shows additional elements of the calendar services 150. The calendar services 150 may be implemented as a server or a set of servers that are accessible via the network 120. The calendar services 150 may include a model training module 205, a prediction request module 210, a prediction reconciliation module 215, a data source module 225, and a user interface module 220.

The model training module 205 may be configured to train one or more machine learning models to predict the availability of a user based on past activity of the user. The past activity of the user may be user activity and/or interactions with a variety of software applications. These applications may include various collaboration tools and enterprise social media tools, such as but not limited to Microsoft Teams, Microsoft SharePoint, and Microsoft Yammer. User conversations, text message, posts, and/or other interactions in one or more of these tools may be analyzed to contribute to building a model of the user's activity. The user conversations may be analyzed to identify information, such as user interests, hobbies, user activities, and/or other behavior based on the content included in these interactions with the various software applications. Metadata may also be used to contribute to the model's understanding of the user's activity. For example, information indicating a location of the user, information regarding public holidays in the location at which the user is located, and/or other such information may be used to further train the model to be able to predict when the user may be available in the future.

The calendar services 120 may utilize various types of machine learning architectures, such as deep neural networks (DNNs), recurrent neural networks (RNNs), convolutional neural networks (CNNs), and/or other types of neural networks. The model training module 205 is configured to train the machine learning module or modules using training data extracted from user data datastore 290. The user data 290 may be obtained by the data source module 225 from the client device(s) 105, the location services 140, the communications platform 160, and/or the application services 170. The user data 290 may be pushed to the data source module 225 of the calendar services 150 by the client device(s) 105, the location services 140, the communications platform 160, and/or the application services 170 via the network 120. The data source module 225 may be configured to periodically query the client device(s) 105, the location services 140, the communications platform 160, and/or the application services 170 for user data. The user data received from these various sources may be stored in the user data datastore 290. The user data datastore 290 may be a relational database or other such data store in which the user data may be organized and queried by model training module 205. The user data datastore 290 may be populated with user data from the various sources discussed above.

In some implementations, the data source module 225 may implement the Microsoft Graph API to access data from client device(s) 105, the location services 140, the communications platform 160, and/or the application services 170. The Microsoft Graph API may be implemented by one or more of these data sources as well to facilitate collection of user data that may be used to train machine learning models that may be predict the availability of users based at least in part on the usage data collected from these various sources. In other implementations, other APIs may be implemented by the data source module 225 and/or the client device(s)

105, the location services 140, the communications platform 160, and/or the application services 170 to facilitate collection of the user data by the calendar services 150.

The model training module 205 may initially train one or more machine learning modules using user data initially obtained from the various data sources that includes user data for multiple users across the user base for these data sources. The model training module 205 may initially use this approach to train the machine learning models because there may not be sufficient amount of data for individual users to fully train the machine learning models. In that case, the model may be initially trained using selected data from the entire user base followed by fine-tuning of the model using user-specific data to train a model that is specific to a particular user. This approach may be referred to as transfer learning, which is a process in which knowledge gained by solving a first problem may be applied to a second different but related problem. In the context of these techniques, the first problem may be to understand and predict the availability of a "synthetic" user that is based on the data of many users, while the second problem is to predict the availability of a specific user.

The training data used by the model training module 205 may be selected from the user data 205. Training data may be selected by an administrator. The training data may be selected by formulating a query that selects a subset of the user data from the user data datastore 290 for use as training data to train the machine learning model or models used by calendar services 150. The accuracy of the training data set may be tested by providing the machine learning model with a test data set. The test data set may be data that is selected from the user data that should produce a known output. In some implementations, the test data may be selected manually by an administrator or other user or may be selected from the user data by running a set of queries to automatically extract and formulate the test data from the user data. The specific contents and format the test data may vary dependent upon the type of machine learning model that has been used to implement the calendar services 150.

Once a non-user specific machine learning model has been trained by the model training module 205, user-specific training may be performed on an instance of the model by providing the machine learning model with user-specific training data selected from the user data datastore 209. The information for the trained models may be stored in the model datastore 295. The model training module 205 may be configured to train a user-specific model or models in response to a request to do so. And administrator may send a request to enroll a user or users to the enrollment module 230 of the calendaring services. For example, an administrator from a corporation or other entity may send a request to the calendar services 150 to enroll a set of users to use the calendar services 150. Individual users may also be permitted to enroll themselves with the calendar services 150. For example, an individual user may enroll themselves with the calendar services 150 to for managing the user's personal calendar information. The individual user may purchase these services as part of a bundle of services, such as for cloud-based or cloud-supported software services from the communications platform services 160 and/or the application services 170. Furthermore, in some implementations, the communications platform services 160 and/or the application services 170 may automatically enroll a new user to their respective services with the calendar services 150.

The graphical user interface module 220 may be configured to generate a user interface that permits a user to interact with the calendaring services 150. The user interface module 220 may be configured to generate a user interface 220 that may be accessed, for example, via the web browser 130 of the client device 105 and/or via a web-browser enabled native application 135. The user interface module 220 may be configured to provide a user interface that allows an administrator to set up user-specific models for a set of users. For example, the user interface module 220 may provide a user interface that allows the administrator to upload a list of users for which user-specific models are requested. The user information may be uploaded from a corporate or organizational directory. The user information may be obtained via the data source module 225.

The prediction request module 210 may be configured to process requests for predictions of user availability received from the client device(s) 105, the location services 140, the communications platform 160, the application services 170, and/or another device or service that is not illustrated herein. A request for a prediction of user availability may include an identifier of the user for which the prediction is requested, and a type of prediction requested. The user identifier may be a username, email address, user identifier, and/or other information that may be used to uniquely identify the user to the calendar services 150. The user identifier may be assigned to the user by the calendar services 150 at the time that the user is enrolled with the calendar services 150. The type of prediction requested may specify one or more supported types of predictions to be obtained for the user or may specific a time period for which the prediction is desired. The time period may for example be "next available" indicating that a prediction for when the user may next be available is requested, "next week" indicating that a prediction of the user's availability over the next week is requested, or "next month" indicating that a prediction of the user's availability over the next month is requested. These time periods are merely examples and the calendar services 150 may be configured to support request for these time periods and/or other time periods. FIGS. 3, 4A, 4B, 4C, and 5 illustrate examples of some of the types of predictions that may be requested. The prediction may be a prediction for when the user may be next available as in FIG. 3 or may request a prediction of user availability over a time period, such as a day, week, month, or year as illustrated in FIGS. 4A, 4B, 4C, and 5. The prediction information may include a confidence score associated with that time estimate or estimates. Where the user availability prediction includes information for the time period, the time period may be subdivided into hours, half hours, days, weeks, or other predetermined units of the time period and a confidence score may be associated with each subdivision.

The prediction reconciliation module 215 may be configured to receive the prediction information for a user from the prediction require module 210 and to reconcile that prediction with location information for the user that may be obtained from the location services 140 and/or from the user device 105 via the data source module 225. The prediction request module may make a prediction that the user will be available within a predetermined period of time, but that prediction may be based at least in part in the user typically being located at a particular location on that particular day of the week and particular time. For example, the user may have scheduled weekly meeting at a particular conference room on the corporate campus and the user's expected availability is based at least in part on the user being predicted to be at the corporate campus for the meeting. However, the location information for the user shows that the user is located several hours away in a different city. The prediction reconciliation module 215 may send an indication to the prediction request module 210 request module that the prediction does not appear to be correct. The prediction request module 210 may revise the prediction to reduce the probability that the prediction is correct and/or discard the prediction and generate a new prediction that the user may be unavailable. The prediction reconciliation module 215 may also revise a prediction to indicate that a user is more likely to be available based on a location of the user. For example, the prediction request module 210 may predict that a user will be unavailable on a particular day, because the user is typically off of work on that day. However, the location information obtained for the user may indicate that the user is located on the corporate campus or at another work-related location and provide an indication to the prediction request module 210 that the prediction may need to be revised.

FIG. 3 is an example user interface that shows an example of an active time prediction for a user. The user interfaces 305 and 310 shown in FIG. 3 may be rendered by the native application 135, the web browser 1130, the operating system, or another application on the client device 105. In the example illustrated in FIG. 3, a new meeting interface 305 is shown where a user may set up a new online meeting. The user interface 305 may be used by a communications and collaboration application of the communications platform services 160 to allow a user to set up a new online meeting. The user interface 305 may also be used by a native application 135 on the client device to set up a new meeting. For example, the native application 135 may be a communications and collaboration application, such as Microsoft Team, an email client that includes functionality for setting up meetings, and/or another application that includes functionality for setting up an online meeting. The meeting invitation may specify various information, such as the date and time of the meeting and a physical location (if any) where participants may decide to meet in person. The meeting invite may include a set of users to invite. Some implementations may include a set of required participants 310 and a set of optional participants 315. The optional participants may be left blank if there are no non-required participants for the online meeting. The new meeting interface 305 may include a cancel button 375 and a sent invite button 380. The cancel button can be used to cancel setting up the meeting. If the meeting has already been set up, the cancel button may be used to cancel changes that have been made to the meeting or to exit out of the meeting information if the meeting information has not been edited. The sent invitation button 380 can be used to send a meeting invitation to the email addresses of the required and/or optional users.

The required participants 310 and the optional participants 315 may be identified by entering an email address, user identifier, the user's first and/or last name, and/or other information that can be used to identify the user. In some implementations, the user may click on or hover the mouse pointer over a username or identifier of the required participants 310 or the optional participants 315 to trigger the user interface 320 to be rendered. The user interface 320 provides additional details regarding the user, such as their office address, full email address, telephone number, and/or other information. The user interface 320 may also include buttons that can be activated to call the user, email the user, and/or to start a text messaging session with the user.

The user interface 320 may include an availability prediction 325 for the user. The availability prediction may be requested by the application that has initialized the user interface 320, and the request may be transmitted to the calendar services 150 via the network 120. The calendar services 150 can access a user-specific model for the user that has been generated by the calendaring services 150. The user-specific model can provide a prediction as to when the user is expected to be available. In the example illustrated in FIG. 3, the availability prediction includes a time estimate as to when the user may next be available, and a confidence score associated with that time estimate. In this example, the confidence score is set to 90% indicating that the user-specific model has predicted with a high level of confidence that the user will be available within the predicted time frame. The example shown in FIG. 3 provides a predicted next time that the user may be available. However, more detailed predictions made that provide predictions over a longer period of time, as can be seen in the example user interfaces show in FIGS. 4A, 4B, 4C, and 5.

Figure 4A:
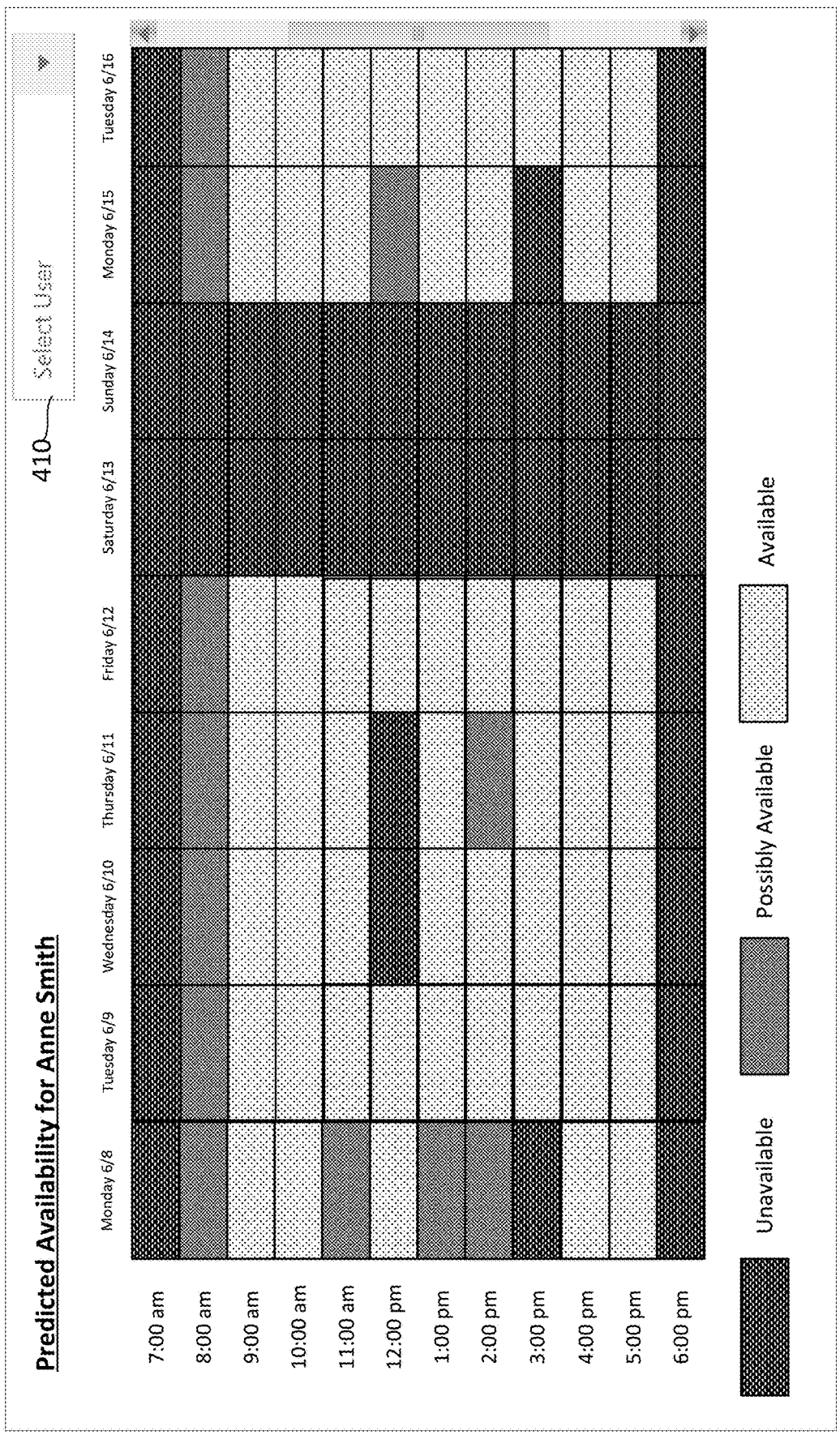
FIGS. 4A, 4B, and 4C are example user interfaces that show examples of predicted availability of users.
Figure 4B:
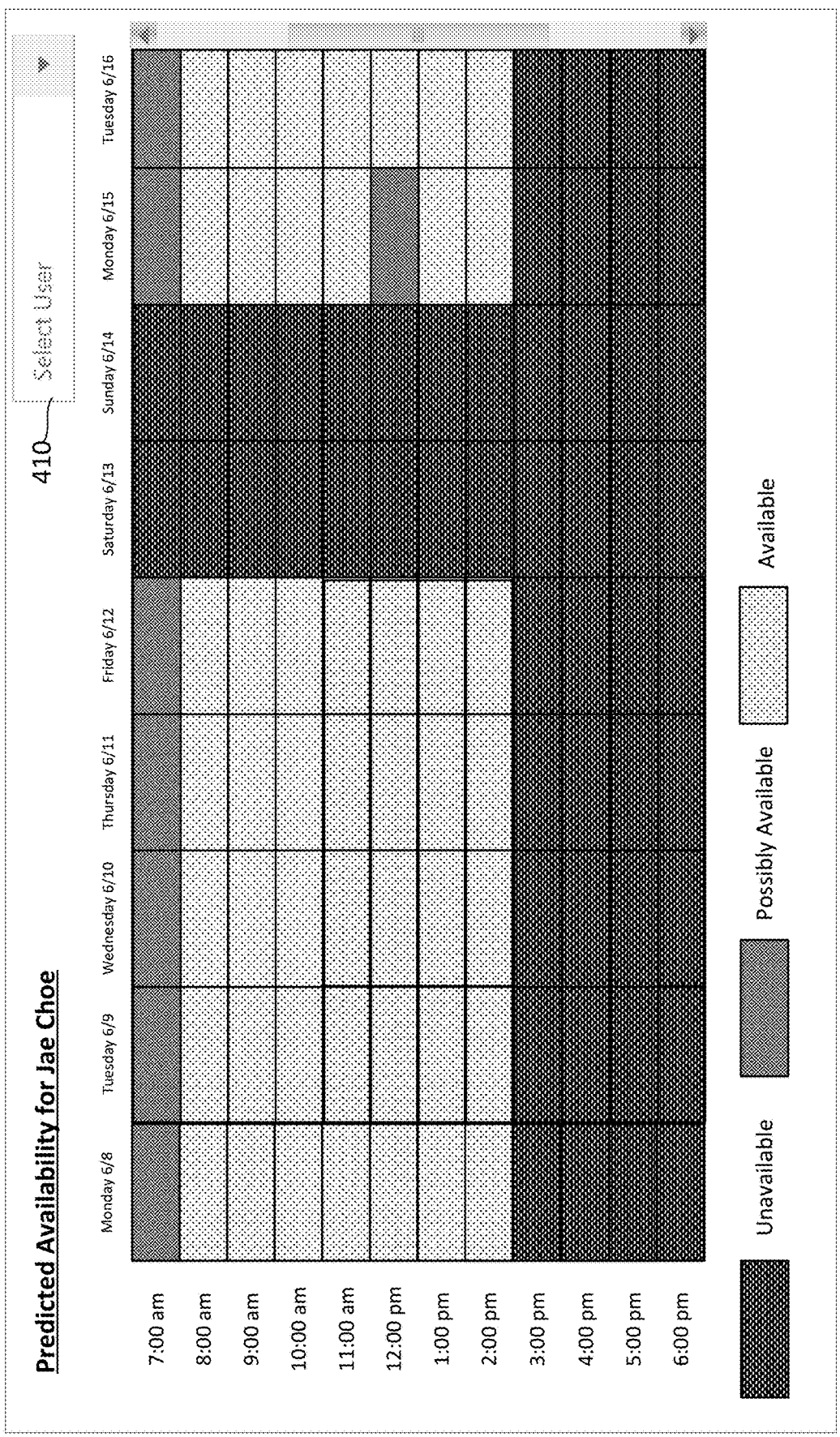
Figure 4C:
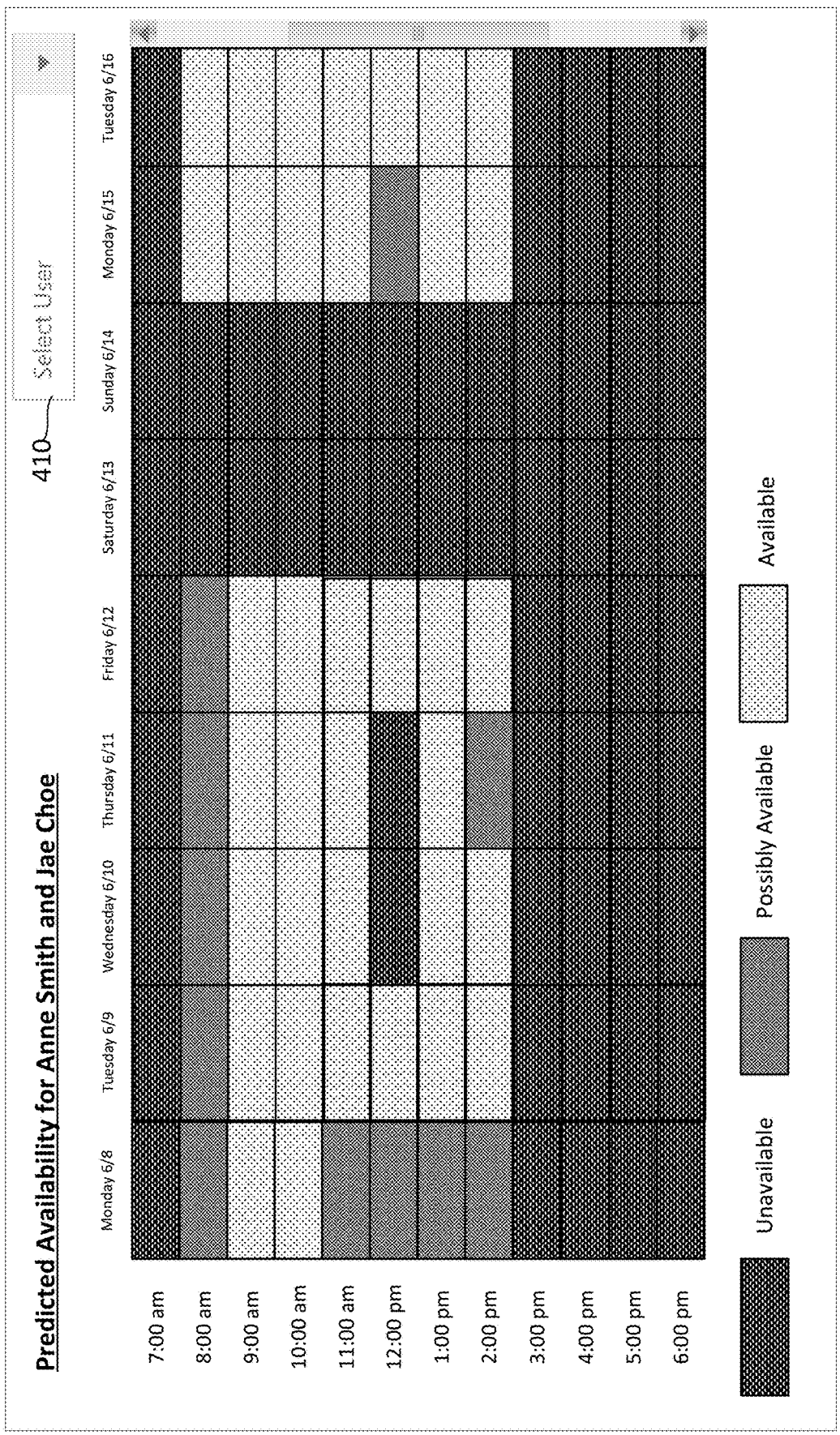

FIGS. 4A, 4B, and 4C are example user interfaces that show examples of predicted availability of users. FIG. 4A is an example user interface 405 that provides more detailed predicted availability for a user. The rendering of the user interface 405 may be triggered in a similar manner as that of user interface 320 in FIG. 3 by clicking on or hovering over a username included in a meeting request. Alternatively, the user interface 305 may include a "schedule users" button (not shown), that causes the user interface 405 to be rendered. The user interface 405 may include a dropdown list 410 that allows the user to select a user for which the availability information is to be displayed, or as seen in FIG. 4C, select multiple users for a combined availability prediction.

The user interface 405 includes a grid. The x-axis (horizontal axis) of the grid represents a specific date, and the y-axis (vertical axis) of the grid represents a one-hour block of time from that day. Each box on the grid represents a one-hour period of time on a specific date. The calendar services 150 makes a prediction as to the availability of the user and provides an indication as to whether the user is predicted to be available for that one-hour block of time on that specific date. The grid entries may be color coded, and/or as shown here, shaded in differently so that someone viewing the user interface can readily discern when the user is predicted to be available. Other types of indicia of the predicted availability of the user may be provided. In the example illustrated in FIG. 4A, there are only predicted states: (1) the user is unavailable, (2) the user is possibly available, and (3) the user is available. These predictions may be made based on previous user behavior analyzed by the machine learning model. The predictions may also be correlated with location information associated with the user to determine whether the prediction is likely to be correct. For example, if the prediction indicates that the user may be available in 1 hour, but the user has just got to the airport two hours away according to their location information, then the user most likely is not going to be available in 1 hour regardless of what their past behavior indicates. The prediction information is provided as guidance only and the user is free to ignore the predictions if they wish. The user may select a day and time to schedule the meeting by clicking on one of the blocks in the grid.

FIG. 4B is an example of the user interface 405 that includes predicted availability data for a second user. As can be seen from the predicted availability data for the second user, the second user appears to work an earlier shift than the first user whose data was illustrated in FIG. 4A. A composite of the availability information can be generated for more than one user by combining the availability information. Such a composite of information may be useful for planning an online meeting and/or other event that requires multiple users to attend. The composite information can show dates and/or times where all of the required participants are predicted to be available. Optional participants may be considered when making a recommendation, and the grid may be colored and/or shaded differently all of the required and a least a portion of the optional users are available. The composite availability information illustrated in FIG. 4C may be generated by selecting multiple users from the dropdown 410. Alternatively, the user interface 305 may include a "check availability" option that allows a user to specify which users to include when determining a composite availability. In the example illustrated in FIG. 4C, the composite availability for a block is determined to be the most restrictive prediction for that block for each of the users included in the composite availability chart. For example, if a first user is available, but the second user is unavailable for a particular block of time, then that block of time will be shown as being unavailable. Clicking on a particular box representing an hour on a particular day in the calendar of the user interface 405 may select that day and time and populate that date and time into the meeting interface 305 of FIG. 3.

FIG. 5 is another example of a user interface 505 that shows an example of an active time prediction for a user. The user interface 505 is similar to the user interface 405, except the user interface 505 shows a full calendar month of availability for the user. Each day of the month in this example is shaded according to the predicted availability of the user rather than on a per-hour basis as in the user interface 405. The calendar services may also be configured to provide a composite availability view of the availability of multiple users on the user interface 505 similar the user interface 405 discussed in the preceding examples. In some implementations, the user at the client device 105 displaying the user interface 505 may click on a box representing a day to obtain a more detailed breakdown of that day. For example, clicking on a box representing a day in the calendar may cause the client device 105 to render the user interface 405 that display detailed information for each hour of the day. If the predicted availability information has not available at the client device 105, the client device 105 may send a request to the calendar services 150 to obtain that information. In other implementations, clicking on a particular box representing a day in the calendar of the user interface 505 may select that day and populate that date into the meeting interface 305 of FIG. 3. The client device 105 may also prompt the user for a specific start and end time or start time and meeting duration from the user.

Figure 6:
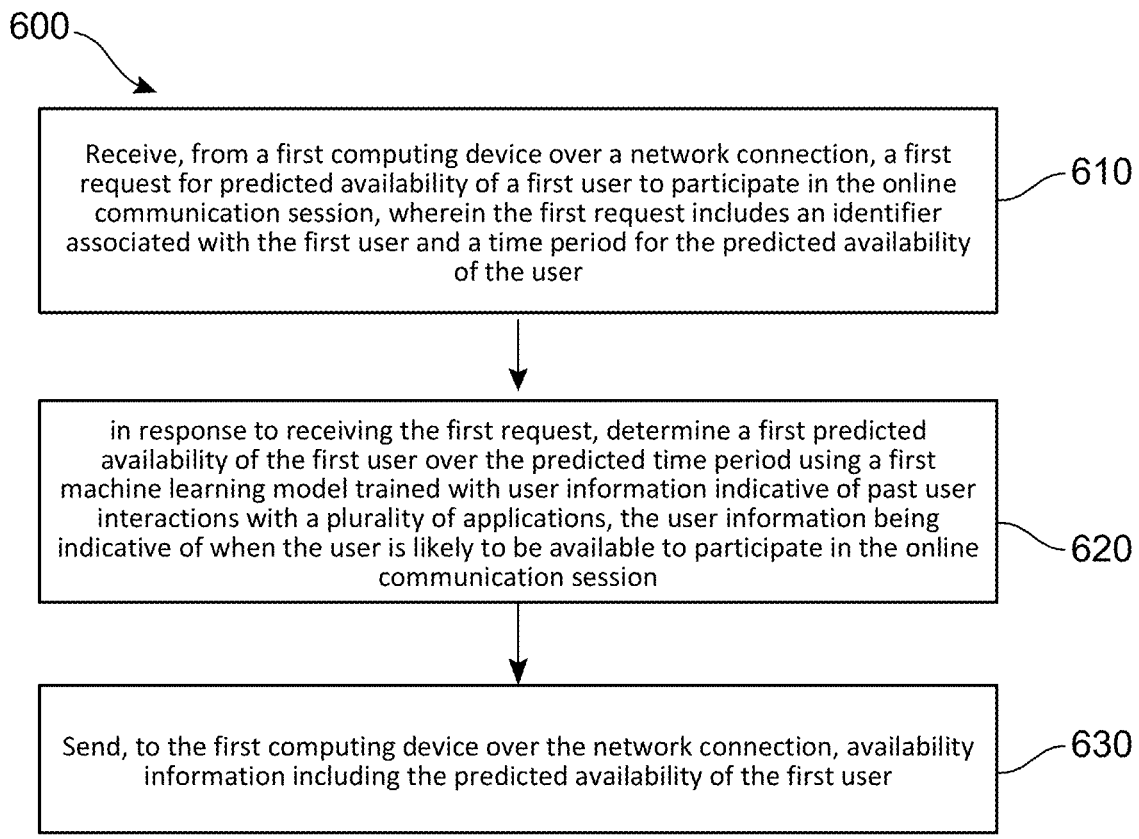
FIG. 6 is a flow chart of an example server-side process for predicting user availability.

FIG. 6 is a flow chart of an example process 600 for predicting user availability. The process 600 may be implemented by a data processing system, such as the calendar services 150. The process 600 may be used to predict when a user may be available to facilitate scheduling of an online meeting or other event that includes the user. The process 600 uses the machine learning techniques described in the preceding examples to predict when the user may become available.

The process 600 may include an operation 610 of receiving, from a first computing device over a network connection, a first request for predicted availability of a first user to participate in the online communication session. The first request includes an identifier associated with the first user and a time period for the predicted availability of the user. The first request may be received from a client device 105. The request may be generated by a web-based application being executed in the browser 130 of the client device 105 or by a native application 130. As discussed in the preceding examples, the web-based or native application may be associated with one or more of the application services 170, and/or the communications platform services 160. The application may be an email client, a word processing application, a spreadsheet application, or other type of application that may facilitate cooperative work between users and may means for inviting other users to participant in an online meeting or other event. The application may alternatively be associated with a communications and collaboration platform, a social media platform, and/or a networking platform.

The process 600 may include an operation 620 of determining, in response to receiving the first request, a first predicted availability of the first user over the predicted time period using a first machine learning model trained with user information indicative of past user interactions with a plurality of applications. The first machine learning model may be trained using data from a plurality of data sources. As discussed above, the user interactions with multiple applications may be analyzed in order to predict when a user may be available to schedule an online communication session or other event based on the past interactions with these applications. The machine learning model can infer patterns in the user's behavior from these past interactions to predict when the user may be available in the future. The user information may be indicative of when the user is likely to be available to participate in the online communication session. As discussed in the preceding examples, the calendar services 150 may make a prediction as to when the user may be available next and/or may make a prediction as to when the user may be available over an upcoming period of time. For example, the calendaring service may predict the availability of the user over a next day, over a next week, over a next month, or over another predetermined period of time specified in the request for user availability information. The The process 600 may include an operation 630 of sending, to the first computing device over the network connection, availability information including the first predicted availability of the first user. The calendar services 150 may send the availability information to the client device 105 from which the request for user availability originated. The availability information may be presented to a user at the client device 105 by rendering user availability on a display of the client device 105. Examples of user interfaces that may be used to present such availability information are illustrated in FIGS. 3, 4A, 4B, 4C, and 5. The availability information may also include a confidence score indicative of a confidence level of the model in the predicted availability of the user. The confidence score may be rendered with the availability information to permit the user of the client device 105 to make a determination whether the user would like to rely on the availability information when scheduling the online communication session or other event.

The calendar services 150 may divide the time period included in the request into a plurality of segments of time of a predetermined period when determining the predicted availability of the user. For example, the availability request may request an availability prediction for the user for a day, and the calendar services 150 may divide the day up into twenty-four hours and determine a predicted availability of the first user for each of the hours. In another example, the availability request may request an availability prediction for the user for a week, and the calendar services 150 may divide the day up into seven days and determine a predicted availability of the first user for each of the days.

The calendar services 150 may also determine a combined or cumulative predicted availability for multiple users. The combined predicted availability may be determined as discussed with respect to the example illustrated in FIG. 5. Furthermore, the calendar services 150 may prioritize users when determining the combined predicted availability. For example, calendar services 150 may receive an indication that a first subset of users are required for an online meeting while a second subset of users are optional. The combined predicted availability of the users may be based primarily on the availability of the required users. However, an indication may be provided where indicate that one or more of the optional users are not available at a particular time while a different indication may be provided where both the required and optional users are available.

The calendar services 150 may receive, from the first user device, an indication of a selected date and time for the online communication session responsive to sending the availability information to the first user device. The calendar service 150 may then send an invitation to any users that were associated with the request for availability information. The invitation may include date and time information for the online meeting or other event, a description of the meeting or other event, and/or a link and/or instruction for connecting to the online meeting. The invitation may add the online meeting to a calendar of each of the users that is maintained by the calendar services 150.

Figure 7:
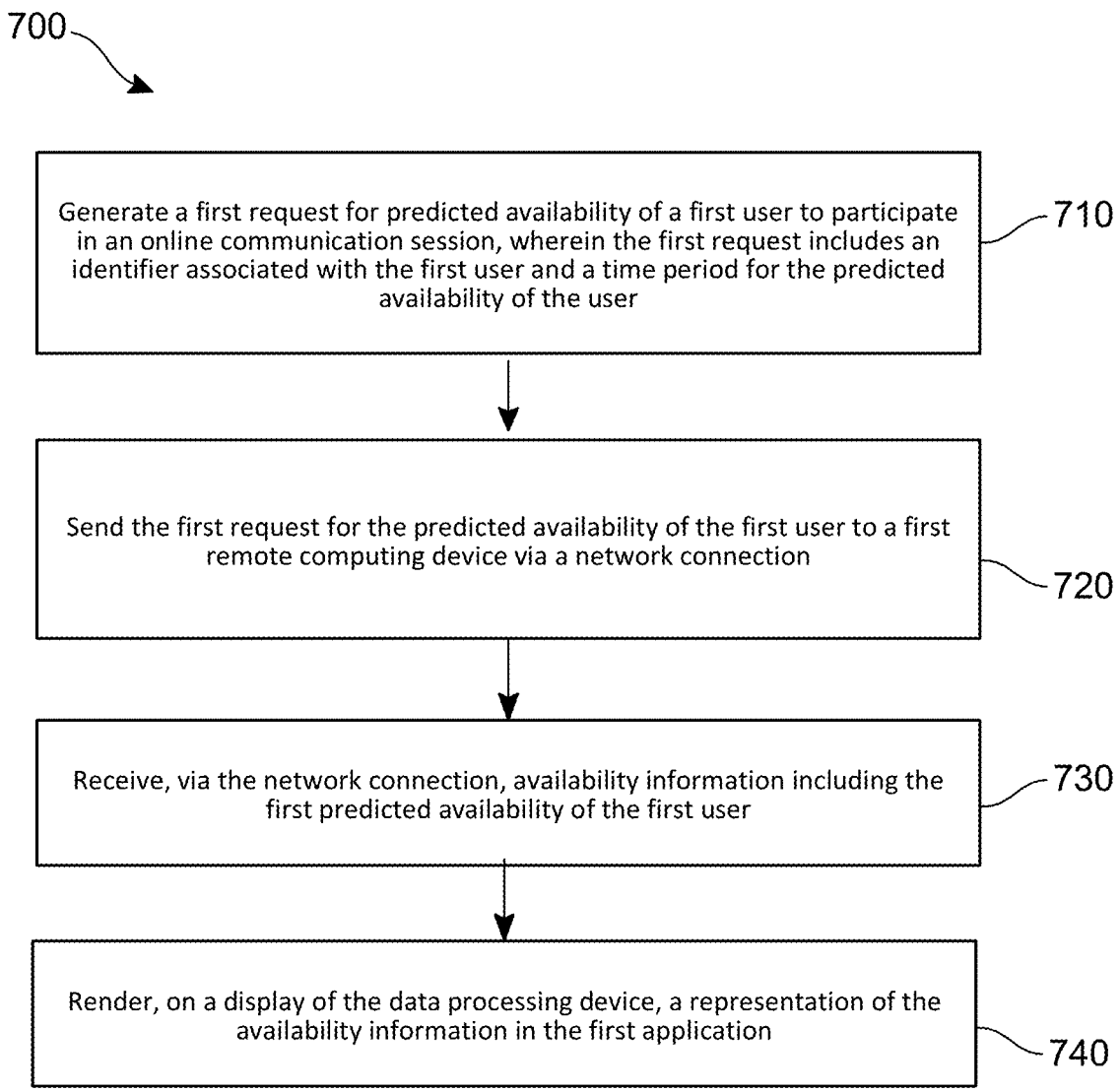
FIG. 7 is a flow chart of an example client-side process for obtaining user availability information.

FIG. 7 is a flow chart of an example client-side process 700 for obtaining user availability information. The process 700 may be implemented by a client device 105, and mores specifically on the web-browser 130 or the native application 125. The process 700 may be used to request predicted user availability from the calendar services 150. The predicted user availability may be for one or more users, and the users may be prioritized. For example, some users may be indicated to be required while others are indicated to be optional.

The process 700 may include an operation 710 of generating a first request for predicted availability of a first user to participate in an online communication session, wherein the first request includes an identifier associated with the first user and a time period for the predicted availability of the user.

The process 700 may include an operation 720 of sending the first request for the predicted availability of the first user to a first remote computing device via a network connection. The client device 105 may sent the first request for predicted availability over the network 120 to the calendar services 150.

The process 700 may include an operation 730 of receiving, via the network connection, availability information including the first predicted availability of the first user. The calendar services 150 may determine a predicted availability for the one or more users included in the request sent in operation 720 and provide availability information to the client device 105 in response to receiving the request that was sent in operation 720.

The process 700 may include an operation 740 of rendering, on a display of the data processing device, a representation of the availability information in the first application. As discussed in the preceding examples, the client device 105 may render the predicted user availability information in various ways. FIGS. 3, 4A, 4B, 4C, and 5 illustrates some examples of the ways that the availability information may be displayed to a user of the client device 105. The availability information may include a confidence score indicative of a confidence level of the model in the predicted availability, and the client device 105 may render the confidence score with the availability information. Furthermore, combined availability information may be received from the calendar services 150 as illustrated in FIG. 5. The combined availability information may be particular useful when attempting to schedule an online meeting or other event that includes multiple users, as the combined availability information reflects the availability of all of the required participants to a meeting. The combined availability information may also include an indication whether any optional participants are available to meet at a particular time.

The calendar services 150 may divide the time period included in the request into a plurality of segments of time of a predetermined period when determining the predicted availability of the user. For example, the availability request may request an availability prediction for the user for a day, and the calendar services 150 may divide the day up into twenty-four hours and determine a predicted availability of the first user for each of the hours. In another example, the availability request may request an availability prediction for the user for a week, and the calendar services 150 may divide the day up into seven days and determine a predicted availability of the first user for each of the days. The client device 105 may render a calendar type or grid-type interface as illustrated in FIGS. 4A, 4B, and 4C where the availability prediction was for a time period.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
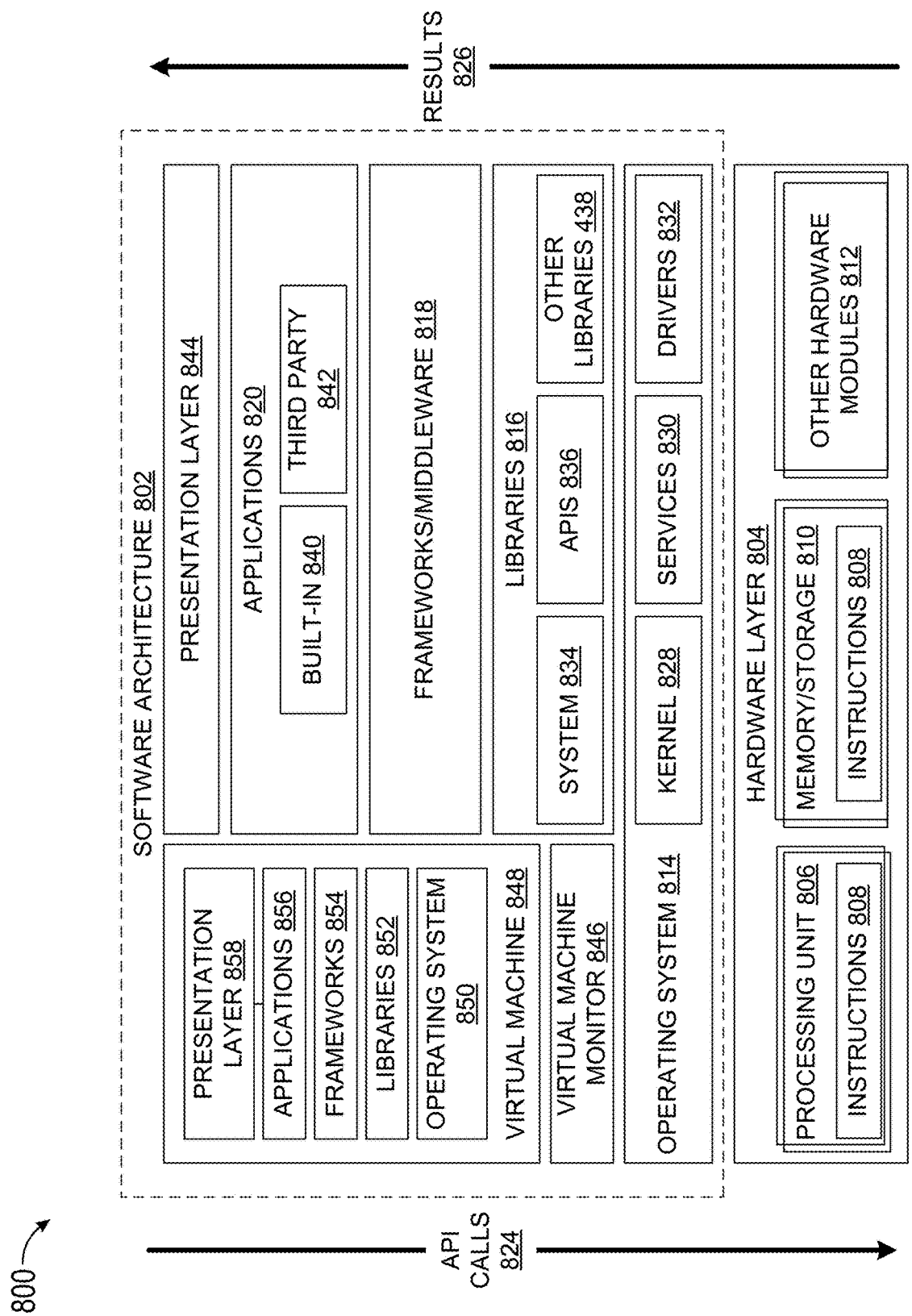
FIG. 8 is a block diagram illustrating an example software architecture, various portions of which may be used in conjunction with various hardware architectures herein described, which may implement any of the features herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 808 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 814, libraries 872, frameworks 854, applications 856, and/or a presentation layer 858.

Figure 9:
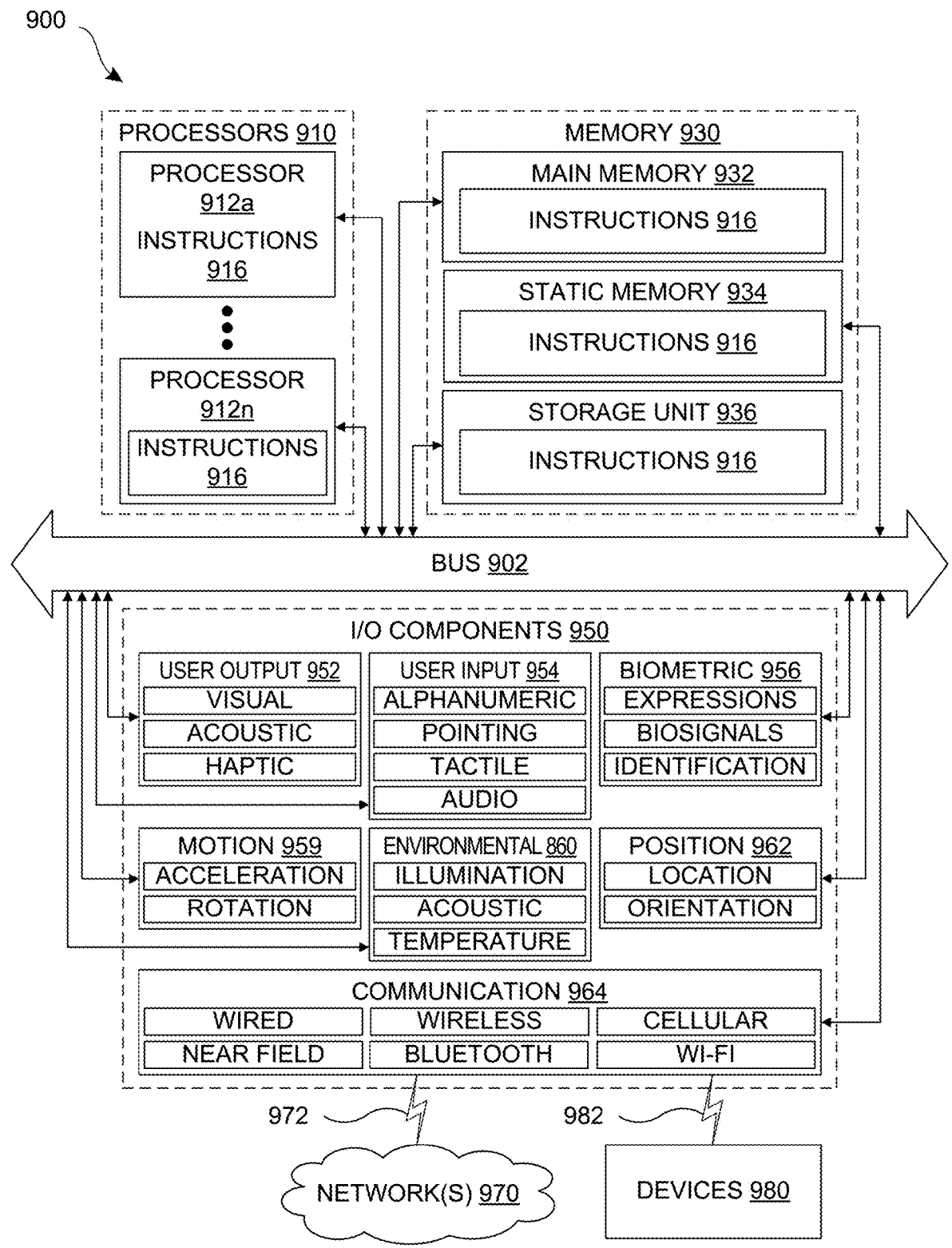
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a computer-readable medium storing executable instructions for causing the processor to perform operations comprising:
      receiving, from a first computing device over a network connection, a first request for predicted future availability of a first user to participate in an online communication session, wherein the first request includes an identifier associated with the first user and a time period for the predicted future availability of the first user;
      in response to receiving the first request, determining a first predicted future availability of the first user over the time period using a first machine learning model trained with user information indicative of past user interactions with a plurality of applications, the user information being indicative of when the first user is likely to be available to participate in the online communication session; and
      sending, to the first computing device over the network connection, availability information including the first predicted future availability of the first user.

2. The data processing system of claim 1, wherein the availability information includes a confidence score indicative of a confidence level of the model in the predicted future availability of the first user.

3. The data processing system of claim 1, wherein to determine the predicted future availability of the first user the computer-readable medium includes instructions configured to cause the processor to perform operations of:
   dividing the time period included in the first request into a plurality of segments of time of a predetermined duration; and
   determining a plurality of predicted future availabilities of the first user, wherein each respective predicted future availability of the plurality of availabilities is associated with a respective one of the segments of time.

4. The data processing system of claim 1, wherein the first request includes a request for the availability of a plurality of users, and wherein the computer-readable medium includes instructions configured to cause the processor to perform operations of:
   determining a second predicted future availability of a second user over the predicted time period using a second machine learning model associated with the second user; and
   analyzing the first predicted future availability and the second predicted future availability to determine a combined predicted future availability of the first user and the second user, wherein sending the availability information includes transmitting the combined predicted future availability of the first user and the second user to the first computing device.

5. The data processing system of claim 4, wherein the first request includes a first priority associated with the first user and a second priority associated with the second user, wherein the first priority is higher than the second priority, and wherein the computer-readable medium includes instructions configured to cause the processor to perform operations of:
   determining the combined predicted future availability to indicate availability based on the availability of the first user.

6. The data processing system of claim 1, wherein the computer-readable medium includes instructions configured to cause the processor to perform operations of:
   training the first machine learning model using user data for a plurality of user obtained from a plurality of data sources; and
   further training the first machine learning model with user data associated with the first user.

7. The data processing system of claim 1, wherein the computer-readable medium includes instructions configured to cause the processor to perform operations of:
   receiving, from the first computing device, an indication of a selected date and time for the online communication session responsive to sending the availability information to the first computing device; and
   sending, to a second computing device associated with the first user, an invitation to participate in the online communication session at the selected date and time.

8. A method implemented in a data processing system for predicting user availability to participate in an online communication session, the method comprising:
   receiving, from a first computing device over a network connection, a first request for predicted future availability of a first user to participate in the online communication session, wherein the first request includes an identifier associated with the first user and a time period for the predicted future availability of the first user;
   in response to receiving the first request, determining a first predicted future availability of the first user over the time period using a first machine learning model trained with user information indicative of past user interactions with a plurality of applications, the user information being indicative of when the first user is likely to be available to participate in the online communication session; and
   sending, to the first computing device over the network connection, availability information including the first predicted future availability of the first user.

9. The method of claim 8, wherein the availability information includes a confidence score indicative of a confidence level of the model in the predicted future availability of the first user.

10. The method of claim 8, wherein determining the predicted future availability of the first user further comprises:

dividing the time period included in the first request into a plurality of segments of time of a predetermined duration; and determining a plurality of predicted future availabilities of the first user, wherein each respective predicted future availability of the plurality of availabilities is associated with a respective one of the segments of time.

11. The method of claim 8, wherein the first request includes a request for the availability of a plurality of users, including the first user and a second user, the method further comprising:

determining a second predicted future availability of the second user over the predicted time period using a second machine learning model associated with the second user; and analyzing the first predicted future availability and the second predicted future availability to determine a combined predicted future availability of the first user and the second user, wherein sending the availability information includes transmitting the combined predicted future availability of the first user and the second user to the first computing device.

12. The method of claim 11, wherein the first request includes a first priority associated with the first user and a second priority associated with the second user, wherein the first priority is higher than the second priority, wherein the method further comprises:

determining the combined predicted future availability to indicate availability based on the availability of the first user.

13. The method of claim 8, further comprising:

training the first machine learning model using user data for a plurality of user obtained from a plurality of data sources; and further training the first machine learning model with user data associated with the first user.

14. The method of claim 8, further comprising:

receiving, from the first computing device, an indication of a selected date and time for the online communication session responsive to sending the availability information to the first computing device; and sending, to a second computing device associated with the first user, an invitation to participate in the online communication session at the selected date and time.

15. A data processing system comprising:

a processor; and a computer-readable medium storing executable instructions for causing the processor to perform operations comprising:

generating a first request for predicted future availability of a first user to participate in an online communication session, wherein the first request includes an identifier associated with the first user and a time period for the predicted future availability of the first user;

sending the first request for the predicted future availability of the first user to a first remote computing device via a network connection;

receiving, via the network connection, availability information including first predicted future availability of the first user; and rendering, on a display of the data processing system, a representation of the availability information in a first application.

16. The data processing system of claim 15, wherein the availability information includes a confidence score indicative of a confidence level of the predicted future availability of the first user.

17. The data processing system of claim 16, wherein the predicted future availability of the first user comprises information a plurality of predicted future availability indications, wherein each predicted future availability indication is associated with a respective one of a plurality of segments of time of a predetermined duration comprising the time period, and to render the representation of the availability of information the computer-readable medium includes instructions configured to cause the processor to perform an operation of:

rendering a representation of the availability information that includes a rendering of the plurality of segments of time and the predicted future availability information associated with each of the plurality of segments of time.

18. The data processing system of claim 16, wherein the first request includes a request for the availability of a plurality of users, including the first user and a second user, and wherein the computer-readable medium includes instructions configured to cause the processor to perform operations of:

receiving combined predicted future availability information for the first user and the second user; and rendering a representation of the combined predicted future availability information on a display of the data processing system.

19. The data processing system of claim 17, wherein the first request includes a first priority associated with the first user and a second priority associated with a second user, wherein the first priority is higher than the second priority, and wherein the computer-readable medium includes instructions configured to cause the processor to perform operations of:

rendering the representation of the combined predicted future availability includes rendering an indication that the first user and the second user are available where based on the availability of the first user.

* * * * *